United States Patent
Kokubo et al.

(10) Patent No.: US 7,174,270 B2
(45) Date of Patent: Feb. 6, 2007

(54) ROTATION ANGLE DETECTING APPARATUS AND METHOD OF DETECTING ROTATION ANGLE

(75) Inventors: Harukatsu Kokubo, Anjo (JP); Tetsuya Yamakita, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 429 days.

(21) Appl. No.: 10/776,616

(22) Filed: Feb. 12, 2004

(65) Prior Publication Data

US 2004/0204902 A1   Oct. 14, 2004

(30) Foreign Application Priority Data

Mar. 31, 2003   (JP)   ............... 2003-097282

(51) Int. Cl.
*G06F 15/00*   (2006.01)
(52) U.S. Cl. .................. 702/151; 702/142; 73/504.07; 324/772; 318/661; 318/667; 318/799; 318/571
(58) Field of Classification Search .............. 702/151, 702/142, 44, 150; 73/117.3, 195, 862.08, 73/862.338, 504.07, 660; 318/799, 661, 318/667, 571; 324/772
See application file for complete search history.

(56) References Cited

U.S. PATENT DOCUMENTS

| | | | | |
|---|---|---|---|---|
| 4,305,281 A | * | 12/1981 | Lee et al. ...................... 73/195 |
| 4,653,315 A | * | 3/1987 | Ament et al. ............... 73/117.3 |
| 5,003,948 A | * | 4/1991 | Churchill et al. ........... 123/352 |
| 5,027,303 A | * | 6/1991 | Witte ........................... 702/44 |
| 5,587,975 A | * | 12/1996 | Kobayashi ............... 369/13.02 |

FOREIGN PATENT DOCUMENTS

JP   A 11-337371   12/1999

\* cited by examiner

*Primary Examiner*—John Barlow
*Assistant Examiner*—Hien Vo
(74) *Attorney, Agent, or Firm*—Oliff & Berridge, PLC

(57) ABSTRACT

A rotation angle detecting apparatus having a reference signal-generating device that generated a reference signal; a rotation angle detecting section that generated an output signal in response to the reference signal; a feedback control section that determines a rotational angular speed based on the output signal and performs feedback control to calculate a rotation angle; and a free-running range change device that narrows a free-running range of the rotational angular speed at a time of starting settling of the rotation angle. In the rotation angle detecting apparatus, the free-running range of the rotational angular speed at the time of starting the settling of the rotation angle is narrowed, whereby the settling time can be shortened. Accordingly, the time that elapses before it becomes possible to detect a rotation angle can be shortened correspondingly.

14 Claims, 7 Drawing Sheets

ROTATION ANGLE DETECTING APPARATUS AND METHOD OF DETECTING ROTATION ANGLE

This application claims priority from JP 2003-097282, filed Mar. 31, 2003, the disclosure of which is incorporated herein by reference thereto.

BACKGROUND OF THE INVENTION

1. Field of Invention

The invention relates to a rotation angle detecting apparatus and a method of detecting a rotation angle.

2. Description of Related Art

Conventionally, an electric-powered driving system has been incorporated into vehicles, including an electric car, as an electric-powered vehicle, and a torque of a drive motor, as an electrically-operated machine, is produced, i.e. a drive motor torque. The drive motor torque is transferred to a driving wheel. In such an electric-powered driving system, the drive motor receives a direct current from a battery and is driven thereby to produce the above-described drive motor torque for driving. The drive motor also receives a torque through the inertia of the electric car to generate a direct current and supply the current to regenerate (recharge) the battery.

In addition, the drive motor has a rotor, as a rotating body, rotatably provided therein. The electrically-operated machine's components are provided radially outside the rotor. The rotor has a pair of magnetic poles composed of N-pole and S-pole permanent magnets, and the components include a stator having stator coils for U-phase, V-phase and W-phase.

Further, as for an electric-powered driving system, which has been incorporated into a hybrid car, as an electric-powered vehicle. The hybrid car transfers a part of the torque of an engine, i.e. an engine torque, to a power generator (a generator/motor) as a first electrically-operated machine and the rest of the torque to a driving wheel. A planetary gear unit includes a sun gear coupled to the power generator, a ring gear coupled to the driving wheel, and a carrier coupled to an engine. Thus, the electric-powered driving system transfers the rotation output from the ring gear and the drive motor as a second electrically-operated machine to the driving wheel to thereby produce a driving force.

In addition, the power generator and the drive motor each have a rotor rotatably provided therein. The electrically-operated machine's components are provided radially outside the rotor. Each rotor has a pair of magnetic poles composed of N-pole and S-pole permanent magnets, and the components include a stator having stator coils for U-phase, V-phase and W-phase.

Furthermore, the electric car is provided with a drive motor controller functioning as an electrically-operated machine controller; whereas the hybrid car is provided with a power generator controller and a drive motor controller functioning as electrically-operated machine controllers. The pulse-width modulation signals of U-phase, V-phase, and W-phase, generated in the electrically-operated machine controllers, are sent to an inverter. The above-mentioned stator coils are respectively supplied with phase currents generated in the inverter, i.e. currents of U-phase, V-phase, and W-phase, whereby the corresponding drive motor is driven to produce a drive motor torque. Further, the power generator is driven to produce a torque of the power generator, i.e., a generator torque.

For this reason, the above-mentioned electric-powered driving systems are each provided with a rotation angle detector circuit in order to detect a magnetic pole's location that is indicative of a position of the rotor of the power generator, the drive motor, etc. Based on the magnetic pole location detected by the rotation angle detector circuit, the power generator, drive motor, etc. is controlled. The rotation angle detector circuit includes a resolver as a rotation angle detecting section, in which a reference signal is sent to the resolver thereby to generate a resolver signal, followed by sending the resolver signal to a R/D converter, performing the feedback control with the feedback control section in the R/D converter, and calculating the rotation angle of the resolver. Thus, the magnetic pole's location, represented by the rotation angle, can be detected.

Moreover, in case of causing the R/D converter to output a rotation angle for each control timing, the load on the CPU of the electrically-operated machine controller is increased when the power generator, the drive motor, etc. are controlled with the CPU. Therefore, a rotation angle output from the RID converter at a given timing is used as a reference location. Thereafter, the amount of change in rotation angle from the reference location is entered from the RID converter and, in the CPU, the amount of change at the given timings are accumulated for the reference location to estimate a rotation angle at each control timing whereby a magnetic pole's location is detected.

Incidentally, the rotation angle detector circuit is provided with an exciting circuit in order to generate a reference signal. The exciting circuit is connected to an excitation-use power source and generates the reference signal based on a voltage of the excitation-use power source, i.e. a power source voltage. However, an instantaneous interruption of the signal system or power source system, for example, an instantaneous break in a resolver signal line for sending a resolver signal to the R/D converter or an instantaneous power-down of the power source, lowers a power source voltage and prevents the resolver signal from being entered into the R/D converter. After that, the recovery of the power source voltage permits the resolver signal to be entered into the R/D converter, while the R/D converter cannot be controlled from the inside.

Therefore, when a given length of time elapses after the power source voltage has recovered, the reference location is acquired again. Then, the amounts of the change are accumulated for the reference location to estimate and detect a rotation angle at each control timing, for example, see JP-A-11-337371.

SUMMARY OF THE INVENTION

However, in the conventional rotation angle detector circuit, the time that elapses before a rotation angle output from the R/D converter is settled to make it possible to use the rotation angle as a reference location, i.e. the settling time, becomes longer. As a result, the time that elapses before it becomes possible to detect a rotation angle lengthens proportionately.

It is an object of the invention to provide a rotation angle detecting apparatus and a method of detecting a rotation angle, which can overcome the foregoing problems of the conventional rotation angle detector circuit and which can shorten the time that elapses before it becomes possible to detect a rotation angle in the case of a temporary drop in excitation-use power source voltage.

Therefore, a rotation angle detecting apparatus according to an embodiment of the invention has a reference signal-generating means for generating a reference signal; a rotation angle detecting section for generating an output signal in response to the reference signal; a feedback control section for determining a rotational angular speed based on the output signal and performing feedback control to calculate a rotation angle; and a free-running range change means for narrowing a free-running range of the rotational angular speed at a time of starting settling of the rotation angle.

Further, in the rotation angle detecting apparatus according to the embodiment, the free-running range is made narrower than a given free-running range of the feedback control section.

In the rotation angle detecting apparatus according to the embodiment, the feedback control section performs the feedback control with a predetermined resolution.

In addition, the free-running range change means makes a resolution at the time of starting settling of the rotation angle higher than the given resolution of the feedback control section.

Further, in the rotation angle detecting apparatus according to the embodiment, the free-running range change means lowers the resolution after the settling of the rotation angle has been started.

Still in the rotation angle detecting apparatus according to the embodiment, the free-running range change means makes the free-running range of the rotational angular speed narrower than a given free-running range of the feedback control section when a power source of the reference signal-generating means is turned on.

Also, the rotation angle detecting apparatus according to the embodiment, the free-running range change means has a power source abnormality judging section for judging whether an abnormal condition has occurred in a power source of the reference signal-generating means.

In addition, the free-running range change means makes the free-running range of the rotational angular speed narrower than a given free-running range of the feedback control section in the case where an abnormal condition has occurred in the power source.

In the rotation angle detecting apparatus according to the embodiment, the feedback control section includes a control deviation calculating means for calculating a control deviation based on the output signal; and a settling completion judging means for judging the settling of the rotation angle to have been completed in a case where the control deviation is not more than a threshold.

Further, in the rotation angle detecting apparatus according to the embodiment further has a rotation angle setting means for using, as a reference location, the rotation angle at a time of judging the settling of the rotation angle to have been completed and setting a rotation angle.

A method of detecting a rotation angle according to the invention includes generating a reference signal; generating an output signal in response to the reference signal; performing feedback control based on the output signal; calculating a rotation angle; and making a free-running range of a rotational angular speed at a time of starting settling of the rotation angle narrower than a given free-running range in the feedback control.

BRIEF DESCRIPTION OF THE DRAWINGS

The invention will be described with reference to the drawings, in which:

FIG. 5 is a timing chart showing the operation of the rotation angle detecting apparatus when the excitation-use power source is turned on;

DETAILED DESCRIPTION OF PREFERRED EMBODIMENTS

For purposes of explanation, an electric-powered driving system will be described. The electric-powered driving system is incorporated in an electric car, operating as an electric-powered vehicle, and is arranged to drive a drive motor as an electrically-operated machine. However, the invention can be also applied to an electric-powered driving system which is incorporated in a hybrid vehicle and is arranged to drive a power generator as an electrically-operated machine.

Figure 1:
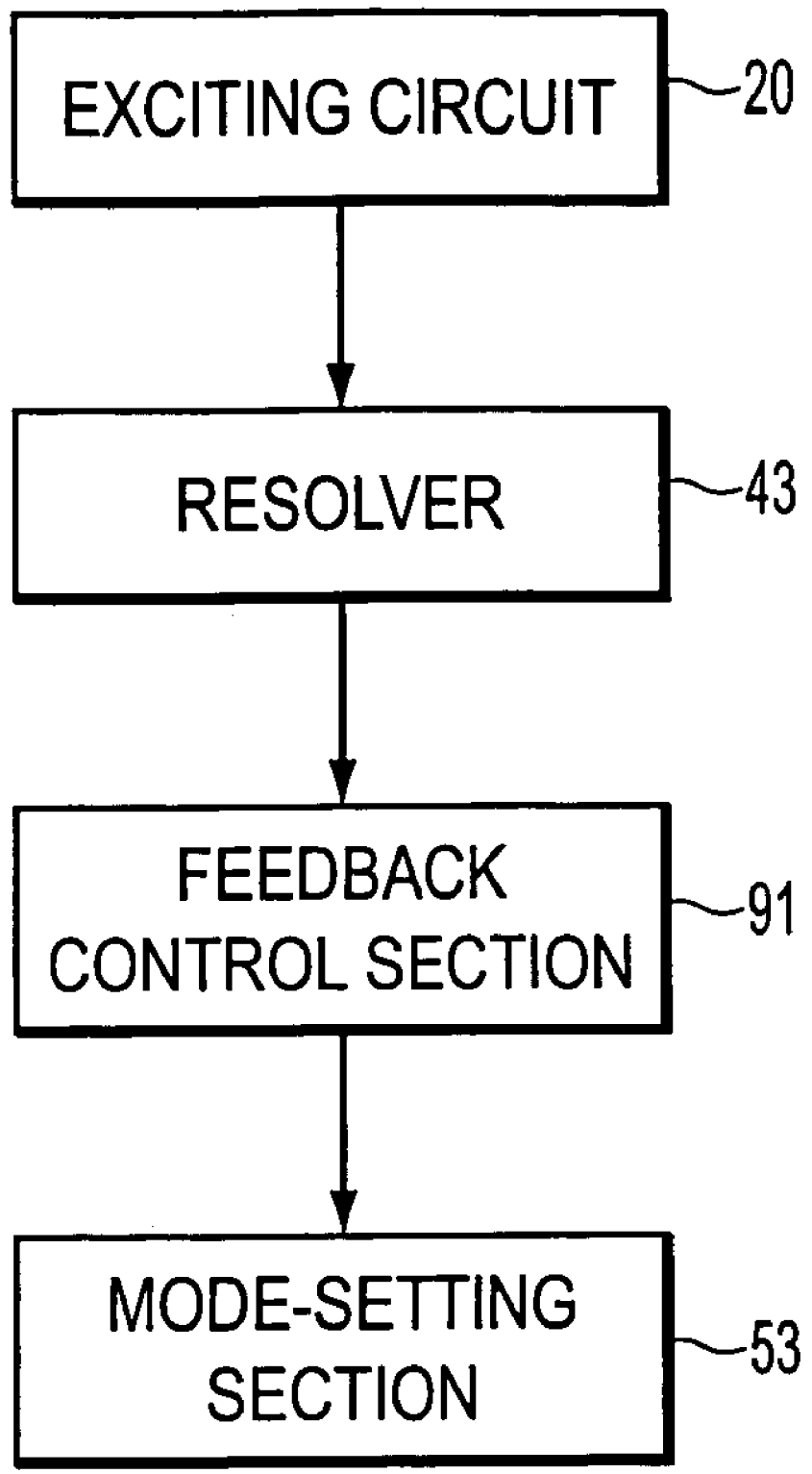
FIG. 1 is a functional block diagram of a rotation angle detecting apparatus of the invention.
Figure 2:
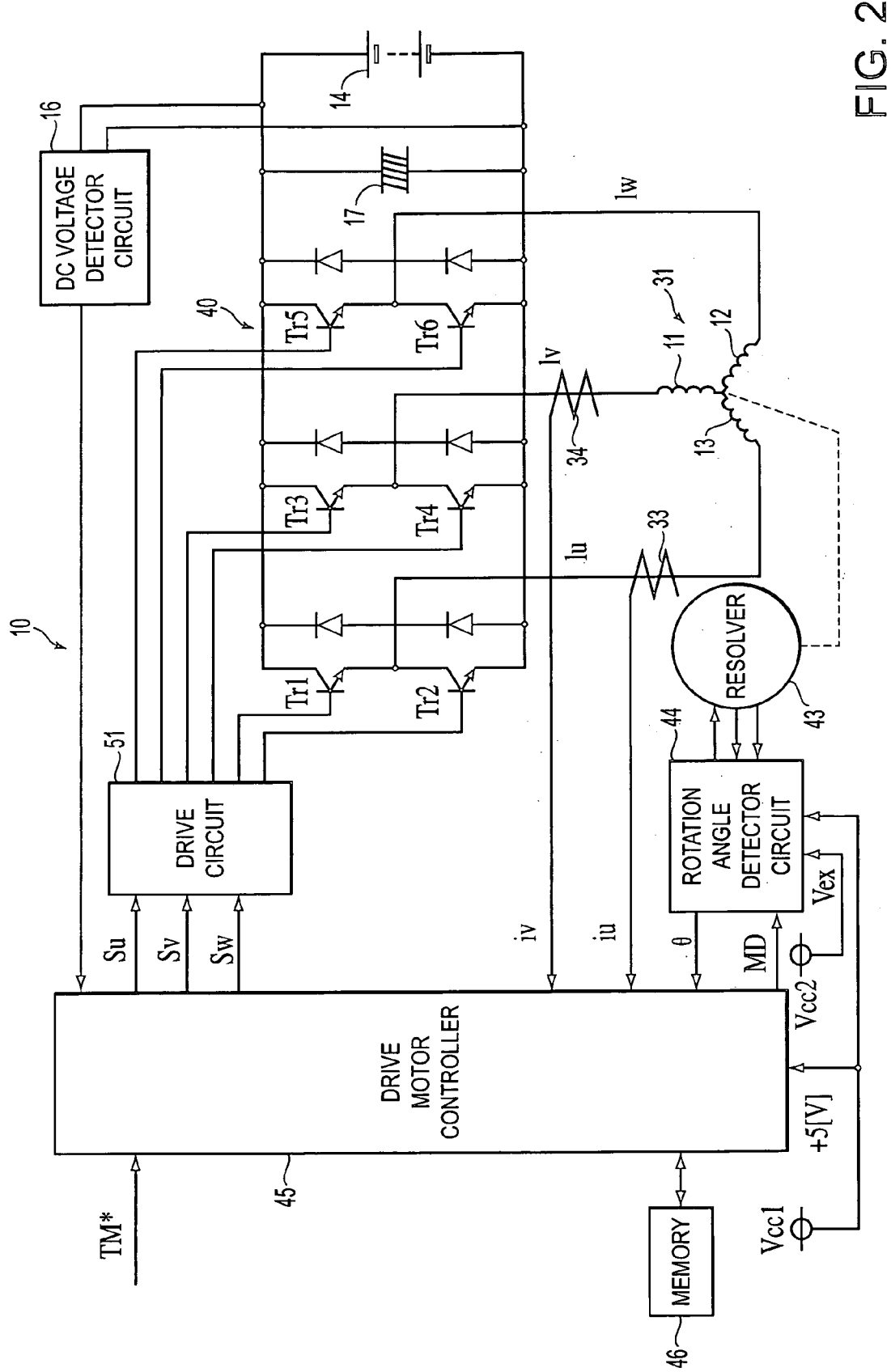
FIG. 2 is a schematic view of an electric-powered driving system.

Referring now to FIG. 1, a functional block diagram of a rotation angle detecting apparatus in the embodiment of the invention, in which the reference numeral 20 indicates an exciting circuit as a reference signal-generating means for generating a reference signal; 43 indicates a resolver as a rotation angle detecting section for receiving the above-described reference signal to generate an output signal; 91 indicates a feedback control section for performing feedback control based on the output signal to calculate a rotation angle; and 53 indicates a mode-setting section as a free-running range change means for narrowing the free-running range of a drive motor rotational speed as an electrically-operated machine's rotational speed at the time of starting the settling of the rotation angle.

In the drawings, the reference numeral 10 indicates an electric-powered driving system, and 31 indicates a drive motor as an electrically-operated machine. A DC brushless drive motor is used as the drive motor 31. The drive motor 31 has a stator formed by winding stator coils 11–13 of a plurality of phases, i.e. U-phase, V-phase and W-phase, around stator cores thereof (not shown) and a rotor (not shown) as a rotating body which is rotatably provided within the stator and has a pair of magnetic poles. In order to drive the drive motor 31 to cause the electric car to run, the DC current from the battery 14 is converted into phase currents, i.e. currents of U-phase, V-phase, and W-phase Iu, Iv, Iw by an inverter 40. Currents of the phases Iu, Iv, Iw are respectively supplied to the stator coils 11–13. The inverter bridge 40 includes six transistors Tr1–Tr6 as switching elements, in which the currents of the phases Iu, Iv, Iw can be generated by selectively turning on or off the transistors Tr1–Tr6.

Figure 3:
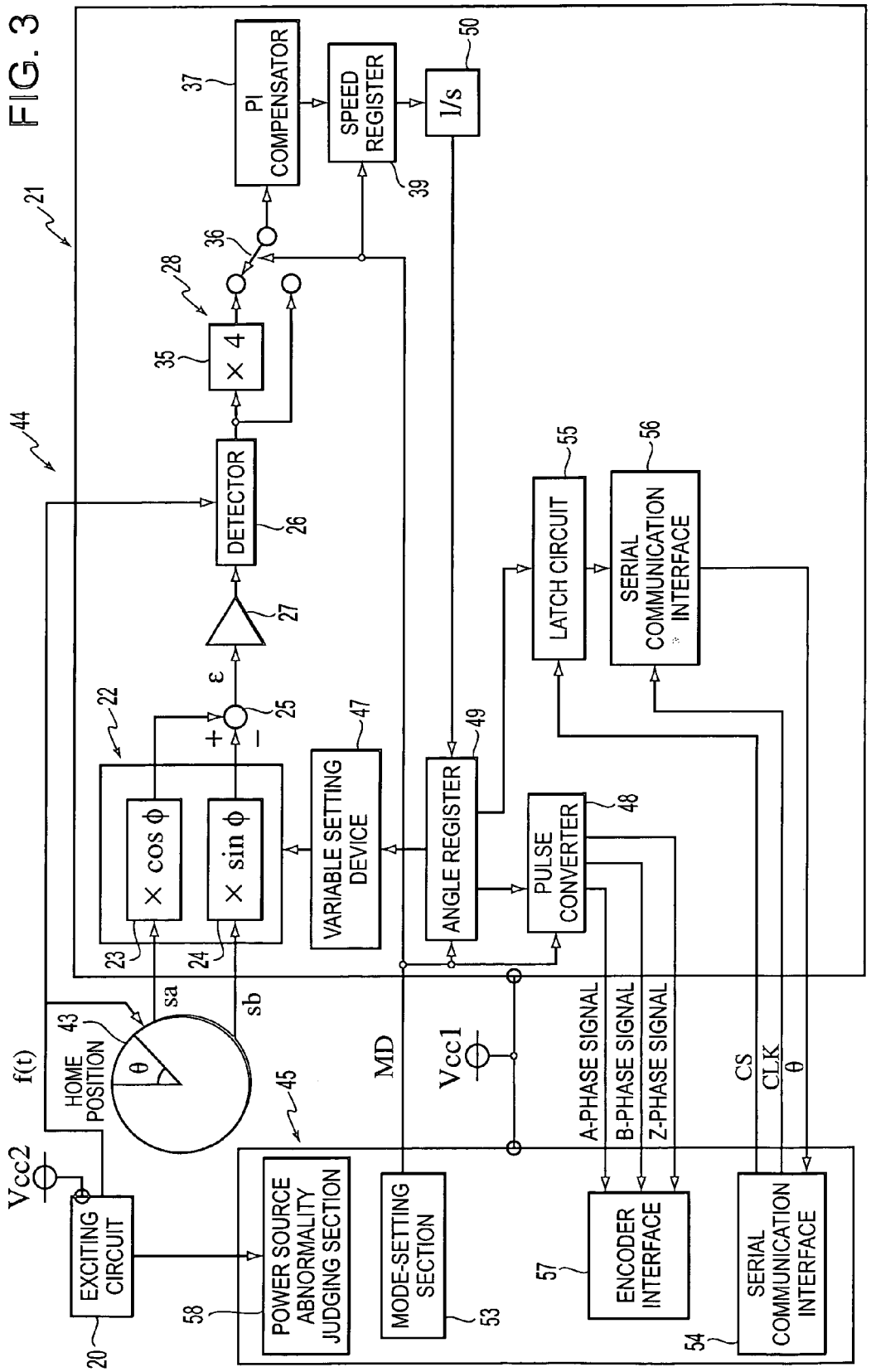
FIG. 3 is a block diagram of a rotation angle detecting apparatus.
Figure 4:
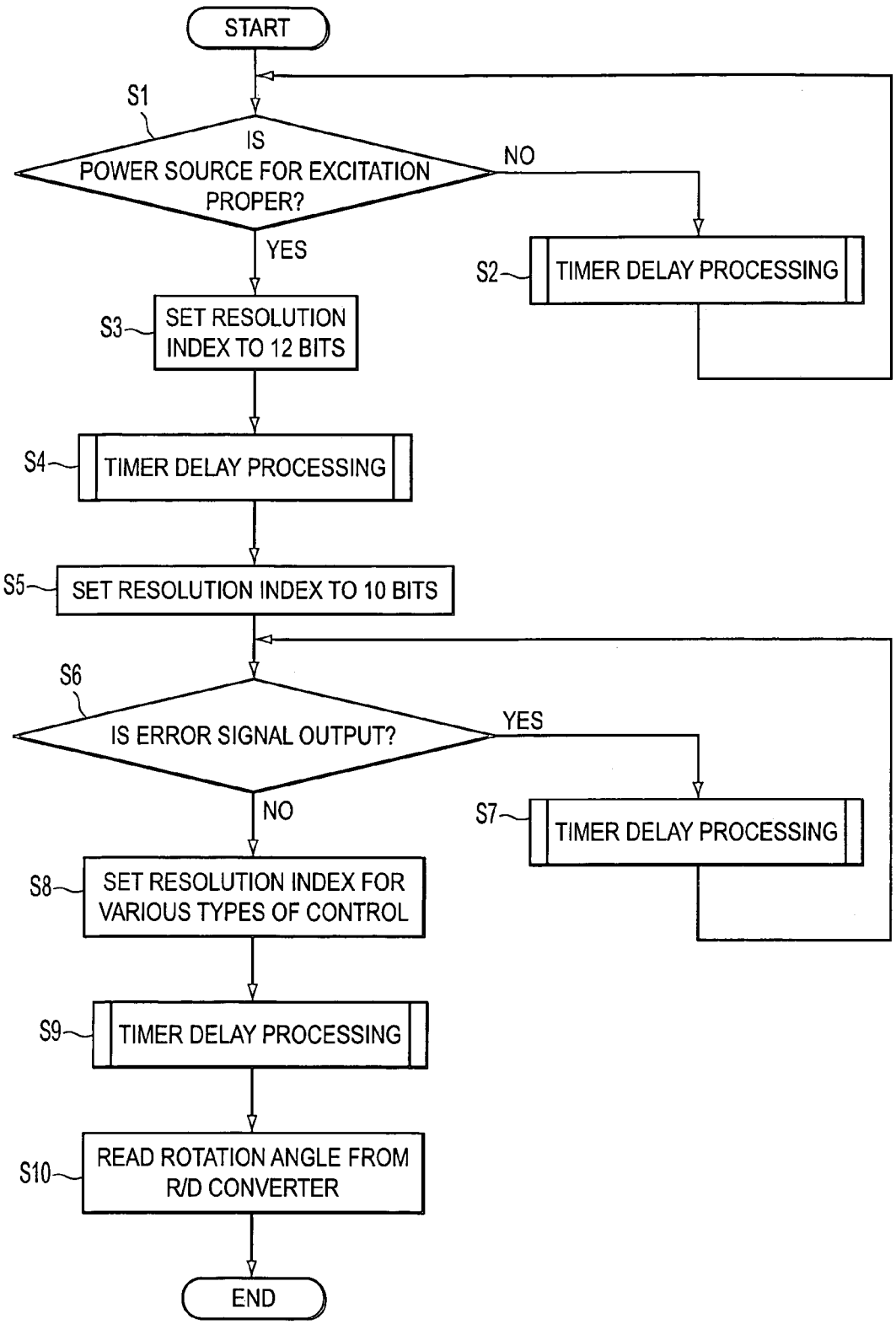
FIG. 4 is a flowchart showing the operation of the rotation angle detecting apparatus.

The resolver 43 is coupled as a rotation angle detecting section. The resolver 43 is connected to the rotation angle detector circuit 44. The rotation angle detector circuit 44 includes an exciting circuit 20 (FIG. 3) as a reference signal-generating means for exciting the resolver 43, and an R/D converter 21 as a rotation angle output device. The R/D converter 21 receives a resolver signal from the resolver 43 to calculate and output a rotation angle θ with respect to the home position of the rotor. Although the R/D converter 21 in the embodiment has been configured by hardware, it may be configured of a control section (not shown) composed of a CPU, MPU, or the like and a recording section (not shown) composed of a RAM, ROM, or the like.

The rotation angle θ is sent to a drive motor controller 45 as an electrically-operated machine controller. In the drive motor controller 45, a magnetic pole's location-detecting means (not shown) carries out a detecting process of the magnetic pole's location to detect the above-described rotation angle θ as a magnetic pole's location. The drive motor controller 45 controls the drive motor 31 based on the detected magnetic pole's location. Also, the drive motor controller 45 includes a control section (not shown) composed of a CPU, MPU, or the like and a recording section (not shown) composed of a RAM, ROM, or the like. Incidentally, the rotation angle detector circuit 44 and the control section of the drive motor controller 45 constitute a computer for executing a given process. Also, the resolver 43, the rotation angle detector circuit 44, the drive motor controller 45, etc. constitute a rotation angle detecting apparatus.

Therefore, when the vehicle controller (not shown) for controlling an electric car sends the drive motor controller 45 a drive motor's target torque TM* indicative of a target value of drive motor torque as a torque-command value, the drive motor controller 45 computes a pulse width corresponding to the drive motor's target torque TM* to generate three phases' pulse-width modulation signals Su, Sv, Sw, each having the resultant pulse width, and sends the pulse-width modulation signals Su, Sv, Sw to a drive circuit 51. The drive circuit 51 receives the pulse-width modulation signals Su, Sv, Sw to generate switching signals for activating the six transistors Tr1–Tr6 respectively and send the switching signals to the inverter 40. In this embodiment the drive circuit 51 has been provided aside from the inverter 40. However, an IPM containing a drive circuit, etc. or the like may be used as an inverter.

As a result, the stator coils 11–13 are respectively supplied with the currents of the phases Iu, Iv, Iw, whereby a torque is produced in the rotor. Operating the electric-powered driving system 10 in this way can drive the drive motor 31 to cause the electric car to run.

In the meantime, when the values of the currents of two of the three phases are determined, the value of the current of the remaining phase is also determined. Therefore, in order to control the currents of the phases Iu, Iv, Iw, currents of a given two phases, excepting one of the three phases, e.g., U-phase and V-phase currents Iu, Iv, are detected by current sensors 33, 34, used as a current-detecting section, and the detected currents iu, iv are sent to the drive motor controller 45. Also, the current sensors may detect the phases' currents Iu, Iv, Iw to send the detected currents iu, iv, iw to the drive motor controller 45.

In the embodiment, reference numeral 16 indicates a DC voltage detector circuit for detecting a voltage Vb of the battery 14; 17 indicates a smoothing capacitor; 46 indicates a memory used as a recording device; and Vcc1 indicates a power source for control. While the power source Vcc1 serves as a CPU power source to apply a +5[V] power source voltage Vc to the drive motor controller 45, the power source also serves as a R/D power source to apply a +5[V] power source voltage Vrd to the R/D converter 21 in the rotation angle detector circuit 44. In addition, Vcc2 indicates an excitation-use power source and the power source Vcc2 serves as an excitation-use power source of the resolver to apply a power source voltage Vex to the exciting circuit 20.

In the drive motor controller 45, the feedback control is performed based on a d-q axes' model such that a d-axis is taken in a direction of the magnetic poles' pair of the rotor and a q-axis is taken in a direction perpendicular to the d-axis.

Therefore, in the drive motor controller 45, for example, detected currents iu, iv sent from the current sensors 33, 34 are sent to an UV-dq converter (not shown), in which the detected currents iu, iv are converted into a d-axis current id and a q-axis current iq based on a magnetic pole's location. Then, the d-axis current id and q-axis current iq are sent to a subtracter for feedback control (not shown). In the subtracter, the deviation Δid between the d-axis current id and a d-axis current-command value id* and the deviation Δiq between the q-axis current iq and a q-axis current-command value iq*, both the current-command values converted from a drive motor's target torque TM*, are calculated to be sent to a voltage command-generating section (not shown). In the voltage command-generating section, a d-axis voltage command value Vd* and a q-axis voltage command value Vq* are generated based on the deviations Δid and Δiq, and the d-axis voltage command value Vd* and q-axis voltage command value Vq* are sent to a dq-UV converter (not shown).

Subsequently, in the dq-UV converter, the d-axis voltage command value Vd* and q-axis voltage command value Vq* are converted into voltage command values of the phases Vu*, Vv*, Vw* based on the magnetic pole's location for sending to a PWM generator (not shown). Then, the PWM generator generates pulse-width modulation signals of the phases Su, Sv, Sw based on the individual phases' voltage command values Vu*, Vv*, Vw* and the voltage Vb detected by the DC voltage detector circuit 16.

The R/D converter 21 will now be described. First, the exciting circuit 20 carries out a process of generating a reference signal thereby to generate a reference signal f(t) changing at a given angular speed ω with a time t taken to be a variable:

$$f(t) = \sin \omega t.$$

The exciting circuit 20 then supplies the reference signal f(t) to a primary coil (not shown) of the resolver 43. The resolver 43 includes two secondary coils provided to form a phase difference of 90 degrees therebetween. When receiving a reference signal f(t), the resolver 43 modulates the reference signal f(t) according to the rotation angle θ with respect to the home position of the rotor to generate first and second output signals sa, sb expressed by voltages:

$$sa = f(t) \cdot \sin \theta, \text{ and}$$

$$sb = f(t) \cdot \cos \theta.$$

Then, the first and second signals sa, sb are output as resolver signals to the R/D converter 21. In processing a resolver signal, only the phase of the signal counts for much, so that the amplitudes of the reference signal f(t) and the first and second output signals sa, sb are set to one(1) in this embodiment.

When the first and second output signals sa, sb are output, the multiplier 22 in the R/D converter 21 multiplies the output signals sa, sb, respectively, by multiplication variables expressed by trigonometric functions, cos φ and sin φ, using the adder circuits (×cos φ, ×sin φ) 23, 24 to calculate the products SA, SB thereof:

$$SA = f(t) \cdot \sin\theta \cdot \cos\phi, \text{ and}$$

$$SB = f(t) \cdot \cos\theta \cdot \sin\phi.$$

Then, the products SA, SB are sent to the subtracter 25. Incidentally, φ is an angle determined based on the first and second output signals sa, sb in the R/D converter 21, i.e. a digital angle.

Subsequently, the subtracter 25 carries out the subtraction of the products SA, SB to calculate the deviation SC therebetween:

$$\begin{aligned} SC &= SA - SB \\ &= f(t) \cdot \sin\theta \cdot \cos\phi - f(t) \cdot \cos\theta \cdot \sin\phi \\ &= f(t) \cdot \sin(\theta - \phi). \end{aligned}$$

Then, the deviation SC is sent through an amplifier 27 to a detector 26 functioning as a control deviation calculating means. The detector 26 carries out a process of calculating a control deviation to remove a reference signal component, based on the deviation SC and the reference signal f(t) sent from the exciting circuit 20, and to generate a modulated component as the control deviation ε indicative of the amount of change in rotation angle θ:

$$\epsilon = \sin(\theta - \phi).$$

The control deviation ε is sent to a deviation-weighting section 28 used as a deviation adjusting means. The deviation-weighting section 28 includes a multiplier circuit (×4) 35 and a switch 36 as a deviation-switching section. The deviation-weighting section 28 carries out a process for deviation adjustment to selectively weight the control deviation ε with a given weighting factor according to a mode-switching signal MD sent from the drive motor controller 45.

Incidentally, in this embodiment, the R/D converter 21 is arranged such that the feedback control is performed therein according to the feedback control section 91 (see FIG. 1), as described later, thereby to calculate a rotation angle θ. For this purpose, the resolutions for the various types of processes can be switched. In addition, the drive motor controller 45 includes, as a free-running range change means, a mode-setting section 53 which carries out a mode-setting process as a process of changing a free-running range thereby to switch a resolution index indicative of the resolution between 12 and 10 bits and set the resolution index. In this embodiment, when a mode-switching signal MD is at a high level indicative of a first state, a low resolution mode as a first mode is set to bring the resolution index to 10 bits; when the mode-switching signal MD is at a low level indicative of a second state, a high resolution mode as a second mode is set to bring the resolution index to 12 bits.

In this case, when the high resolution mode is set, the processing speeds of the various processes become one fourth those in the low resolution mode, and the resolution becomes four times higher than a given resolution of the feedback control section 91 when the low resolution mode is set, i.e. a resolution in case of settling the rotational angular speed ND under the normal control.

In the meantime, the low and high resolution modes are different in weight of the control deviation ε per bit. When the low resolution mode is set, a weight of a control deviation ε per bit is four times that in the case where the high resolution mode is set. Therefore, based on the time when the high resolution mode is set, the weighting factor is taken to be four to weight the control deviation ε with a four times weight when the low resolution mode is set. More specifically, when the mode-switching signal MD is at its low level, the high resolution mode is set, so that no weighting is carried out. Thus, the control deviation E output from the amplifier 27 is directly sent to a PI compensator 37 as first integrating means. Further, when the mode-switching signal MD is at its high level, the low resolution mode is set, so that the control deviation ε output from the amplifier 27 undergoes weighting by the multiplier circuit 35 and the weighted deviation is sent to the PI compensator 37.

Subsequently, the PI compensator 37 carries out a first integration process to integrate the control deviation ε to calculate a rotational angular speed ND expressed by a digital value. The rotational angular speed ND is recorded in a speed register 39, functioning as a speed-recording section, and determined. In this case, the speed register 39 has a 16-bit configuration, in which the weight of the rotational angular speed ND per bit is common to the low and high resolution modes. Further, when the low resolution mode is set, all the sixteen bits are used to represent the rotational angular speed ND; when the high resolution mode is set, the processing speed becomes one fourth that in the former case and, as such, only fourteen bits are used to represent the rotational angular speed ND. Therefore, when the mode-switching signal MD goes into its low level, a CPU bit-switching means in the R/D converter 21 carries out a bit-switching process to mask the two highest bits of the speed register 39 into "0's".

Further, a limiting process is carried out to record a rotational angular speed ND into the speed register 39. In this process, when the rotational angular speed ND is higher than the full bit of the speed register 39, i.e. the maximum value "1111111111111111" indicative of the theoretical maximum speed of the rotational angular speed ND expressed by 16 bits, the overflow is cut to thereby lock the register to the maximum value. Thus, in the case where the numerical value "1" is held at the 15th bit or higher in the low resolution mode, when the mode is switched to set the high resolution mode, the rotational angular speed ND is forced to be changed to the maximum value "001111111111111" expressed by fourteen bits. On the other hand, when the mode is switched from the high resolution mode to the low resolution mode, the value of the rotational angular speed ND is not changed.

Subsequently, the rotational angular speed ND recorded in the speed register 39 is sent to an integrator (1/s) 50 as a second integrated means. The integrator 50 carries out a second integration process thereby to integrate the rotational angular speed ND and to calculate a digital angle φ expressed by a digital value and then records the digital angle φ in an angle register 49. In this case, the angle register 49 has a 12-bit configuration, in which the weight of the digital angle φ per bit is common to the low and high resolution modes. Further, when the low resolution mode is set, only 10 bits are used to represent the digital angle φ; when the high resolution mode is set, all the 12 bits are used to represent the digital angle φ.

When the digital angle φ is thus recorded in the angle register 49, a variable-setting device 47, functioning as a variable-setting means, carries out a variable-setting process thereby to refer to a multiplication variables' map set in a ROM in the R/D converter 21 and reads out multiplication variables of cos φ and sin φ corresponding to the digital angle φ recorded in the angle register 49 to send them to the multiplier 22.

In this case, the feedback control section 91 (FIG. 1) comprises the multiplier 22, amplifier 27, detector 26, deviation-weighting section 28, PI compensator 37, speed register 39, integrator 50, angle register 49 and variable-setting device 47, in which the feedback control is performed so that a phase (θ−φ) becomes zero(0) based on the above-described control deviation ε to make the rotation angle θ and digital angle φ coincide with each other.

Moreover, a pulse converter 48 is provided as pulse-converting means. The pulse converter 48 carries out a pulse conversion process to read outputs from all bits of the angle register 49 and the above-described mode-switching signal MD and to output an A-phase signal and a B-phase signal which respectively indicate the rotational direction of the drive motor 31 and the amount of change in rotation angle θ based on the outputs of the two lowest bits of the angle register 49 for each time when the value of the digital angle φ recorded in the angle register 49 changes. The A-phase and B-phase signals are square-wave signals differing from each other in phase by ninety degrees. The A-phase signal leading the B-phase signal in phase indicates the drive motor 31 rotates in a forward direction. The B-phase signal leading the A-phase signal in phase indicates that the drive motor 31 rotates in a reverse direction.

In the pulse converter 48, a zero-judging means (not shown) carries out a zero judging process to judge whether the digital angle φ reaches zero based on the outputs from all bits of the angle register 49, and to make a zero judgment to output a Z-phase signal when the digital angle is zero. Incidentally, the Z-phase signal is output once for each rotation of the resolver 43. Here, one rotation of the resolver 43 is equivalent to that of the drive motor 31.

When the rotation angle θ converges, a serial communication I/F 54, functioning as a first communication processing means, of the drive motor controller 45 carries out a first communication process to send a latch signal CS to the R/D converter 21 at a given timing. In the R/D converter 21, on receiving the latch signal CS, a latch circuit 55, functioning as a data holding section, latches the digital angle φ located in the angle register 49 at this time and records the latched data in a serial communication I/F 56, functioning as a second communication processing means. The serial communication I/F 56 carries out a second communication process to serially output a digital angle φ according to clock signals CLK from the serial communication I/F 54 to send it as a rotation angle θ to the drive motor controller 45.

The drive motor controller 45 reads the rotation angle θ, sent from the R/D converter 21, to record it in an absolute-value-data recording section (not shown). The rotation angle θ recorded in the absolute-value-data recording section is the digital angle φ which has been recorded in the angle register 49 at the time a latch signal CS is sent to the R/D converter 21. The digital angle φ is to be used as a reference location. Further, at the time of the startup of the drive motor 31, the drive motor controller 45 sends the rotation angle θ recorded in the absolute-value-data recording section to a control data recording section (not shown) to use as an initial value.

In addition, an encoder I/F 57, functioning as a rotation angle setting means, of the drive motor controller 45 carries out a rotation angle setting process, thereby to receive the A-phase, B-phase and Z-phase signals and set the rotation angle θ, recorded in the control data recording section, based on phases of the A-phase and B-phase signals. More specifically, the rotation angle θ is increased when the A-phase signal leads the B-phase signal in phase and the rotation angle θ is reduced when the B-phase signal leads the A-phase signal in phase. The amount of change in the rotation angle θ is thus accumulated for the above-described reference location, whereby the rotation angle θ for each control timing is estimated. On receiving a Z-phase signal, the encoder I/F 57 makes the rotation angle θ recorded in the control data recording section zero.

In the meantime, when the starting key of an electric car is turned on, the power source voltage Vc is provided to the drive motor controller 45 simultaneously with the provision of the power source voltage Vrd to the R/D converter 21, whereby the drive motor controller 45 and R/D converter 21 start their operation. When a given length of time elapses after start of the operations of the drive motor controller 45 and R/D converter 21, the power source Vcc2 is powered up to provide the power source voltage Vex to the exciting circuit 20.

However, because no reference signal f(t) is entered into the resolver 43 until the power source voltage Vex is provided to the exciting circuit 20, the R/D converter 21 goes into a situation where the first and second output signals sa, sb are not entered therein. As a result, the control cannot be established inside the R/D converter 21 and, thus, the R/D converter 21 runs freely.

During the time of instantaneous interruption of the signal system or power source system, for example, when the resolver signal line, used for sending first and second output signals sa, sb to the R/D converter 21, is broken for a moment or when the power source Vcc2 is interrupted for a moment, the power source voltage Vex lowers temporarily and, thus, the R/D converter 21 goes into a situation where the first and second output signals sa, sb are not entered therein. Also, in this case, as in the foregoing case, the control cannot be established inside the R/D converter 21 and the R/D converter 21 runs freely. As a result, it becomes impossible to detect a magnetic pole's location during that time, whereby the electric car cannot be controlled.

In case of electric cars, the power source voltage Vex can be recovered by, for example, an auxiliary machinery battery, etc. after it has lowered. Also, in case of hybrid cars, for example, an engine generates electricity, and the auxiliary machinery battery is charged thereby to enable the recovery of the power source voltage Vex after the power source voltage Vex has lowered.

Therefore, this embodiment shortens the settling time that elapses before a rotation angle θ output from the R/D converter 21 is settled to make it possible to use the rotation angle as a reference location. Thus, it correspondingly shortens the time that elapses before it becomes possible to detect a rotation angle θ, in the following two cases: 1) when the power source Vcc2 is turned on; and 2) the power source voltage Vex is recovered during the time of instantaneous interruption of the signal system or power source system.

For this purpose, a power source abnormality judging section 58, functioning as an abnormality judgment means, for the drive motor controller 45 carries out an abnormality judging process by reading the power source voltage Vex of the power source Vcc2 to judge whether the power source Vcc2 is proper based on whether the power source voltage Vex is in a range to operate the exciting circuit 20 properly or to determine whether the power source voltage Vex is lower than a predetermined threshold.

In the case where the power source Vcc2 is judged to be proper, the mode-setting section 53 brings the mode-switching signal MD to its low level to set the resolution index to 12 bits, whereby the high resolution mode is set. Accordingly, the theoretical maximum speed of the rotational angular speed ND to be recorded in the speed register 39 is suppressed and lowered by constraint. Furthermore, in this condition the settling of a rotational angular speed ND is started.

On the other hand, in the case where the power source Vcc2 is judged to be abnormal, a drive motor stop means (not shown) in the drive motor controller 45 carries out a drive motor-stopping process thereby to stop the drive motor 31, while a time delay processing means (not shown) in the drive motor controller 45 carries out a time delay process to wait for a given first delay time τ1 to elapse. In the case where the electric-powered vehicle is a hybrid car, in the drive motor-stopping process only the engine is driven to cause the hybrid car to run.

Further, when a given length of time τa elapses after the start of the application of the power source voltage Vrd to the R/D converter 21, an error signal ERR is output from the R/D converter 21 to the drive motor controller 45.

After the high resolution mode is set, the time delay processing means waits for a given second delay time τ2 to elapse. After elapse of the delay time τ2, the mode-setting section 53 makes the mode-switching signal MD its high level to set the resolution index to 10 bits to set the low resolution mode. Therefore, after that, the processing speed of the R/D converter 21 can be increased.

A comparing section, functioning as a comparing means (not shown), in the R/D converter 21 carries out a comparing process to judge whether the control deviation ϵ, calculated in parallel with the start of the settling, is less than or equal to a predetermined threshold ϵth. In the case where the control deviation ϵ is judged to be not more than the threshold ϵth, the error signal ERR is brought to its low level indicative of the output state to stop outputting the error signal ERR.

Subsequently, a settling completion judging means (not shown) in the drive motor controller 45 carries out a settling completion judging process to judge whether the error signal ERR is output. In the case where the error signal ERR is output, it is judged that the settling has not yet been completed. Thus, the time delay processing means waits for a given third delay time τ3 to elapse.

In the case where no error signal ERR is output, the mode-setting section 53 sets the resolution index so as to suit the later use, i.e. the trait of various types of control in the drive motor controller 45. Subsequently, time delay processing means waits for a given fourth delay time τ4 to elapse, and reads the rotation angle θ in a mode depending on the use, i.e. low or high resolution mode, after elapse of the delay time τ4.

Thus, when the settling of the rotation angle θ is started, the high resolution mode is set, whereby the free-running range of the inherent angular speed ND can be made narrower than a given free-running range of the feedback control section 91, i.e. a free-running range in the case of settling the rotational angular speed ND under the normal control. As a result, the settling time can be shortened. In addition, after starting the settling of the rotation angle θ, the low resolution mode is set, whereby the processing speed is increased. This makes it possible to further shorten the settling time.

Referring now to the flowchart, in step S1 ajudgment is made whether the excitation-use power source Vcc2 is proper. If YES, the routine goes to step S3, that is the judgment is the excitation-use power source Vcc2 is proper. When the judgment in step S1 is NO, the excitation-use power source Vcc2 is abnormal, the process goes to step S2. In step S2 a timer delay process is executed and then the routine returns to step S1.

At step S3, the resolution index is set to 12 bits and the routine proceeds to step S4 where a timer delay process is carried out. The routine then executes step S5 and sets the resolution index to 10 bits. In step S6 a judgment is made whether the error signal ERR is output. If the error signal ERR is output the routine goes to step S7 and to step S8 if it is not. When the routine goes to step S7, a timer delay process is carried out and then returns to step S6. If the routine has proceeded to step S8, the resolution index is set appropriate to the trait of various types of control. In step S9, a timer delay process is carried out. Following the time delay process, in step S10 the rotation angle θ is read from the R/D converter 21 and then the processing of the routine is terminated.

Figure 5:
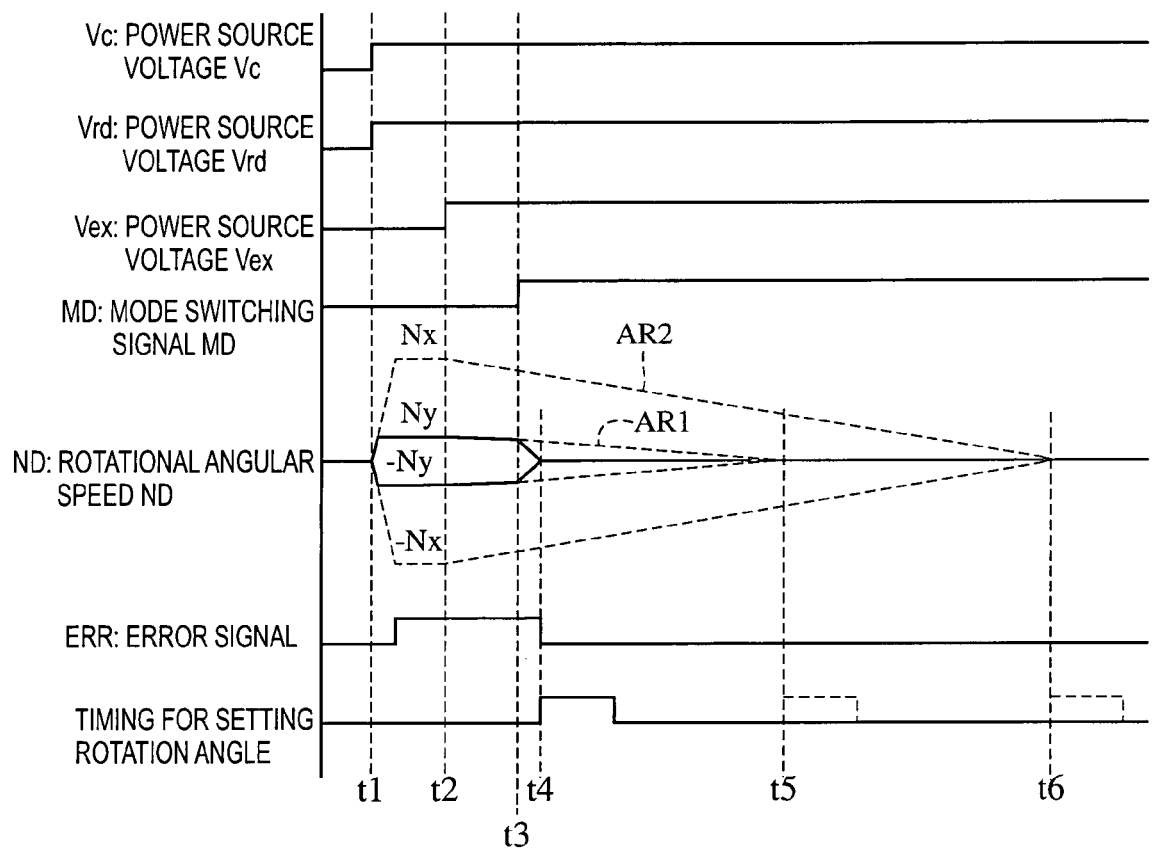
Figure 8:
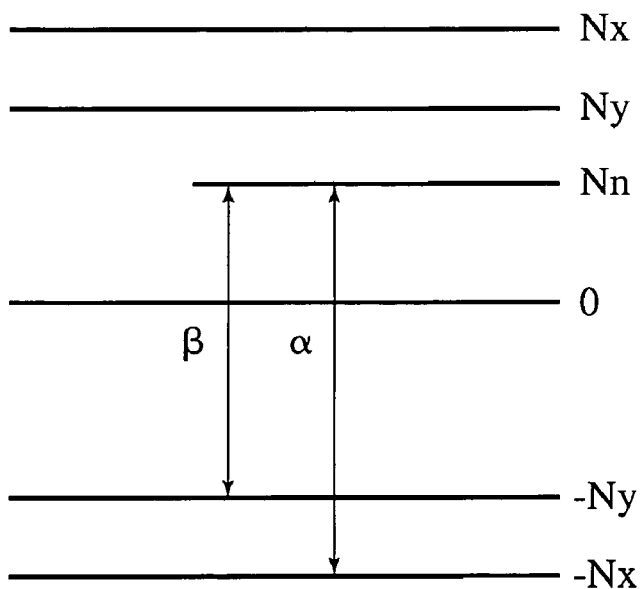
FIG. 8 is a view showing the rotational speed region in settling the R/D converter.

Referring now to the timing chart, the operations of the rotation angle detector circuit 44 when the power source Vcc2 is turned on will be described. First, as shown in FIG. 5, when the starting key of an electric car is turned on, the power source voltage Vc is provided to the drive motor controller 45 at the time t1 concurrently with the provision of the power source voltage Vrd to the R/D converter 21. As a result, the drive motor controller 45 and R/ID converter 21 start to operate. At this time, the mode-switching signal MD is at its low level and the high resolution mode is set. Therefore, the theoretical maximum speed of the rotational angular speed ND, to be recorded in the speed register 39, is forcibly suppressed and lowered. In addition, as shown in FIG. 8, the free-running range of the rotational angular speed ND is narrowed to:

$$-Ny \leq ND \leq Ny.$$

When a given length of time τa elapses after the start of the provision of the power source voltage Vrd to the R/D converter 21, an error signal ERR is output from the R/D converter 21 to the drive motor controller 45. Further, due to the characteristics of the R/D converter 21, during a time interval between the instant when the provision of the power source voltage Vrd to the R/D converter 21 is started and the instant when the given length of time τa elapses, the error signal ERR is masked. As such, the error signal ERR cannot be changed to its high level.

Subsequently, the power source voltage Vex is applied to the exciting circuit 20 at the time t2, the reference signal f(t) is supplied to the primary coil of the resolver 43 and then the settling is started from the free-running range previously described. In parallel with this, the free-running range is gradually narrowed.

Then, the mode-setting section 53 changes the mode-switching signal MD to its high level to set the low resolution mode at time t3. Accordingly, the processing speed is then increased and as such, the free-running range is narrowed rapidly.

At the time t4, the control deviation ϵ reaches the threshold ϵth or below and the value (θ−ϕ) converges. Thus, the error signal ERR is brought to its low level, and the output of the error signal to the drive motor controller 45 ceases. In parallel with this, the serial communication I/F 54 sends a latch signal CS to the R/D converter 21. When the R/D converter 21 receives the latch signal CS, the latch circuit 55 latches the digital angle ϕ currently found in the angle register 49 and records the data, the digital data ϕ, in the serial communication I/F 56. The serial communication I/F 56 outputs a digital angle ϕ serially to send it as a rotation angle θ to the drive motor controller 45.

The drive motor controller 45 reads the rotation angle θ sent from the R/D converter 21 and records it in the absolute-value-data recording section. The reference location is set according to the rotation angle θ recorded in the absolute-value-data recording section. Subsequently, the encoder I/F 57 starts the rotation angle setting process to receive A-phase, B-phase and Z-phase signals and to set the rotation angle θ recorded in the control data recording section based on phases of the A-phase and B-phase signals.

In contrast, in the case where the mode-switching signal MD is not changed to its high level at the time t3 and the settling is continued in the high resolution mode, the processing speed cannot be increased, and therefore the free-running range is gradually narrowed as shown by an area AR1. Thus, the settling time becomes longer and the settling is completed at the time t5.

Incidentally, if the low resolution mode has been set since the starting key of an electric car was turned on, the theoretical maximum speed of the rotational angular speed ND to be recorded in the speed register 39 is not suppressed. Thus, the free-running range of the R/D converter 21 is as follows:

$$-Nx \leq ND \leq Nx.$$

The value Nx is much larger than the value Ny (FIG. 8).

Figure 7:
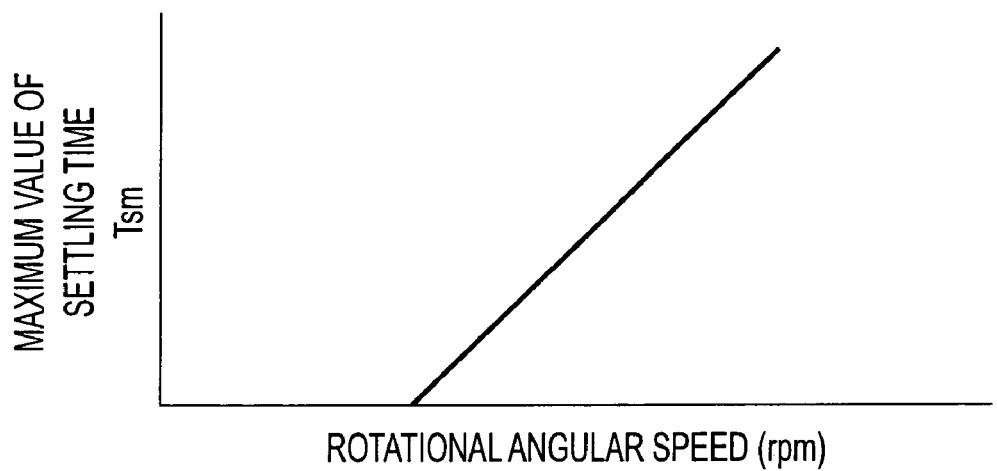
FIG. 7 is a view showing the relationship between drive motor rotational speeds and settling times' maximum values.

When the settling is started under this condition, the settling time becomes considerably longer as shown by an area AR2 and the settling is completed at the time t6. Now, the maximum value of the settling time, Tsm, is set corresponding to the rotational angular speed ND, as shown in FIG. 7. Accordingly, the power source abnormality judging section 58 of the drive motor controller 45 carries out the abnormality judging process, to start measuring the time concurrently with the start of the settling. When the time that has elapsed after the start of the settling exceeds the maximum value Tsm, the power source abnormality judging section 58 judges that an abnormal condition has occurred, for example, the resolver signal line has been physically broken.

Referring now to the timing chart, the operations of the rotation angle detector circuit 44 at the time of instantaneous interruption of the signal system or power source system will be described.

Figure 6:
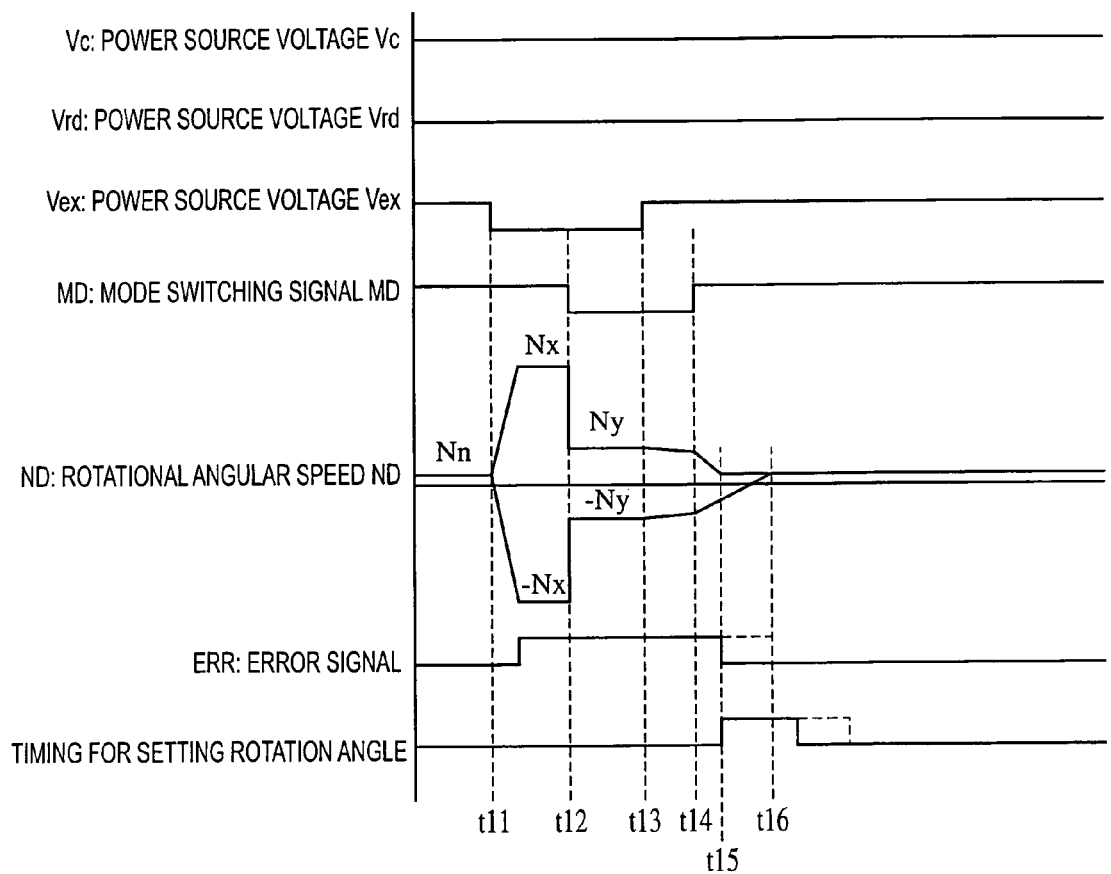
FIG. 6 is a timing chart showing the operation of the rotation angle detecting apparatus at the time of instantaneous interruption of the signal system or power source system.

Considered at this time is a situation meeting the conditions, shown in FIG. 6, the drive motor 31 is driven; the rotational angular speed ND is a value of Nn; the power source voltage Vc is applied to the drive motor controller 45; the power source voltage Vrd is applied to the R/D converter 21; and the drive motor controller 45 and R/D converter 21 are in operation. Under this situation, when the resolver signal line is broken for a moment at the time t11 or when the power source Vcc2 is interrupted for a moment at the time t11, the power source voltage Vex lowers temporarily. This lowering prevents the first and second output signals sa, sb from being entered into the R/D converter 21. Further, when a given length of time τa has elapsed, the R/D converter 21 outputs an error signal ERR to the drive motor controller 45.

At this time, the mode-switching signal MD has been brought to its high level, and therefore the low resolution mode has been set. Because of this, the theoretical maximum speed of the rotational angular speed ND to be recorded in the speed register 39 is not lowered. Also, the free-running range of the R/D converter 21 is not suppressed and it becomes as follows:

$$-Nx \leq ND \leq Nx.$$

Subsequently, the mode-setting section 53 brings the mode-switching signal MD to its low level to set the high resolution mode at the time t12. In parallel with this, the theoretical maximum speed of the rotational angular speed ND to be recorded in the speed register 39 is forcibly suppressed and lowered. Thus, the free-running range of the R/D converter 21 is brought to:

$$-Ny \leq ND \leq Ny.$$

After that, when the power source voltage Vex recovers at the time t13, the primary coil of the resolver 43 is supplied with a reference signal f(t) and then the settling is started from the free-running range of the R/D converter 21. At the same time, the free-running range is gradually narrowed.

Next, the mode-setting section 53 brings the mode-switching signal MD to its high level thereby to set the low resolution mode at a timing of t14. Thereafter the processing speed is increased and, thus, the free-running range is narrowed rapidly.

In the case where the correct rotational direction coincides with the free-running direction of the R/D converter 21, at a timing of t15 the control deviation ϵ reaches the threshold ϵth or below and the value (θ−ϕ) converges. Thus, the error signal ERR is brought to its low level and the output of the error signal to the drive motor controller 45 is ceased.

In parallel with this, the serial communication I/F 54 sends a latch signal CS to the R/D converter 21. When the R/D converter 21 receives the latch signal CS, the latch circuit 55 latches the digital angle ϕ currently found in the angle register 49 at this time and records the data, the digital angle ϕ, in the serial communication I/F 56. The serial communication I/F 56 outputs a digital angle ϕ serially to send it as a rotation angle θ to the drive motor controller 45.

The drive motor controller 45 reads the rotation angle θ sent from the RID converter 21 and records it in the absolute-value-data recording section. Incidentally, the reference location is set according to the rotation angle θ recorded in the absolute-value-data recording section. Subsequently, the encoder I/F 57 starts a rotation angle updating process, thereby to receive A-phase, B-phase and Z-phase signals and update the rotation angle θ recorded in the control data recording section based on phases of the A-phase and B-phase signals.

In contrast, in the case where the correct rotational direction is opposite to the free-running direction of the R/D converter 21, when the control deviation ϵ reaches the threshold ϵth or below, at a timing of t16, later than the timing t15, and the rotation angle θ converges, the error signal ERR is brought to its low level and the output of the error signal to the drive motor controller 45 is ceased. In parallel with this, the encoder I/F 57 starts the rotation angle updating process, thereby to receive A-phase, B-phase and Z-phase signals and update the rotation angle θ recorded in the control data recording section based on phases of the A-phase and B-phase signals. In FIG. 8, the character α indicates a free-running range when the low resolution mode is set in the case where the correct rotational direction is opposite to the free-running direction of the R/D converter 21; β indicates a free-running range when the high resolution mode is set in the same case.

The invention is not limited to the above embodiment and various modifications thereof may be made based on the spirit of the invention without departing from the scope of the invention.

As described above in detail, a rotation angle detecting apparatus according to the embodiment of the invention has a reference signal-generating means for generating a reference signal; a rotation angle detecting section for generating an output signal in response to the reference signal; a feedback control section for determining a rotational angular speed based on the output signal and performing feedback control to calculate a rotation angle; and a free-running range change means for narrowing a free-running range of the rotational angular speed at a time of starting settling of the rotation angle.

In this case, because the free-running range of the rotational angular speed at the time of starting the settling of the rotation angle is narrowed, the settling time can be shortened. Accordingly, the time that elapses before it becomes possible to detect a rotation angle can be shortened correspondingly.

In still another rotation angle detecting apparatus according to the embodiment of the invention, the feedback control section further performs the feedback control with a predetermined resolution. The free-running range change means makes a resolution, at a time of starting settling of the rotation angle, higher than the given resolution of the feedback control section. In this case, because the low resolution mode is set after the settling of the rotation angle has been started, the processing speed is increased. Accordingly, the settling time can be shortened further.

What is claimed is:

1. A rotation angle detecting apparatus, comprising:
   a reference signal-generating device that generates a reference signal;
   a rotation angle detecting section that generates an output signal in response to the reference signal;
   a feedback control section that determines a rotational angular speed based on the output signal and performs feedback control to calculate a rotation angle; and
   a free-running range change device that narrows a free-running range of the rotational angular speed at a time of starting settling of the rotation angle,
   wherein the feedback control section performs the feedback control with a predetermined resolution, and the free-running range change device makes a resolution at the time of starting settling of the rotation angle higher than the given resolution of the feedback control section.

2. The rotation angle detecting apparatus of claim 1, wherein the free-running range is made narrower than a given free-running range of the feedback control section.

3. The rotation angle detecting apparatus of claim 1, wherein the free-running range change device lowers the resolution after the settling of the rotation angle has been started.

4. The rotation angle detecting apparatus of claim 1, wherein the free-running range change device makes the free-running range of the rotational angular speed narrower than a given free-running range of the feedback control section when a power source of the reference signal-generating device is turned on.

5. The rotation angle detecting apparatus of claim 1, wherein the free-running range change device has a power source abnormality judging section for judging whether an abnormal condition has occurred in a power source of the reference signal-generating device, and the free-running range change means makes the free-running range of the rotational angular speed narrower than a given free-running range of said feedback control section in a case where an abnormal condition has occurred in the power source.

6. The rotation angle detecting apparatus of claim 1, wherein the feedback control section comprises:
   a control deviation calculating device that calculates a control deviation based on the output signal; and
   a settling completion judging device that judges the settling of the rotation angle to have been completed in a case where the control deviation is not more than a threshold.

7. The rotation angle detecting apparatus of claim 1, further comprising a rotation angle setting device that uses, as a reference location, the rotation angle at a time of judging the settling of the rotation angle to have been completed and setting a rotation angle.

8. A method of detecting a rotation angle, comprising:
   generating a reference signal;
   generating an output signal in response to the reference signal;
   performing feedback control based on the output signal to calculate a rotation angle; and
   marrowing a free-running range of a rotational angular speed at a time of starting settling of the rotation angle,
   wherein the feedback control is performed with a predetermined resolution, and a resolution at the time of starting settling of the rotation angle is made higher than the given resolution of the feedback control.

9. The method of detecting a rotation angle of claim 8, wherein the free-running range is made narrower than a given free-running range of the feedback control.

10. The method of detecting a rotation angle of claim 8, wherein the resolution is lowered after the settling of the rotation angle has been started.

11. The method of detecting a rotation angle of claim 8, wherein the free-running range of the rotational angular speed is made narrower than a given free-running range of the feedback control when a power source that generates the reference signal is turned on.

12. The method of detecting a rotation angle of claim 8, further comprising:
   judging whether an abnormal condition has occurred in a power source that generates the reference signal, and
   making the free-running range of the rotational angular speed narrower than a given free-running range of said feedback control in a case where an abnormal condition has occurred in the power source.

13. The method of detecting a rotation angle of claim 8, further comprising:
   calculating a control deviation based on the output signal; and
   judging the settling of the rotation angle to have been completed in a case where the control deviation is not more than a threshold.

14. The method of detecting a rotation angle of claim 8, further comprising:
   setting a rotation angle, using the rotation angle at a time of judging the settling of the rotation angle to have been complete as a reference location.

* * * * *